United States Patent [19]
Wiehe, Jr.

[11] Patent Number: 5,289,897
[45] Date of Patent: Mar. 1, 1994

[54] SAWBUCK INCLUDING VIERENDEEL TRUSS CONSTRUCTION

[76] Inventor: William H. Wiehe, Jr., 4404 Manor Hall La., Fairfax, Va. 22033

[21] Appl. No.: 964,902

[22] Filed: Oct. 22, 1992

[51] Int. Cl.$^5$ .......................................... B27B 21/00
[52] U.S. Cl. .................................. 182/154; 182/226; 182/186
[58] Field of Search ............... 182/153, 154, 181–186, 182/224–227; 248/164

[56] References Cited

U.S. PATENT DOCUMENTS

| | | | |
|---|---|---|---|
| 332,749 | 12/1885 | Prall et al. | 248/164 X |
| 1,191,687 | 7/1916 | Gillett. | |
| 1,479,209 | 1/1924 | Topp. | |
| 1,719,253 | 7/1929 | White | 248/164 |
| 1,982,061 | 11/1934 | Marlowe | 182/186 |
| 2,706,829 | 4/1955 | Charnin. | |
| 3,001,559 | 9/1961 | Szopo. | |
| 3,034,546 | 5/1962 | Parsons. | |
| 3,047,092 | 7/1962 | Janda. | |
| 3,148,746 | 9/1964 | Juculano. | |
| 4,386,677 | 6/1983 | Gulezian. | |
| 4,454,929 | 6/1984 | Wellman. | |
| 4,561,336 | 12/1985 | Davis. | |
| 4,609,070 | 9/1986 | Props et al. | 182/181 X |

FOREIGN PATENT DOCUMENTS 364291 1/1938 United Kingdom ............... 182/186

OTHER PUBLICATIONS

M. Salvadori et al., "Structure in Architecture, The Building of Buildings", pp. 190–193, Prentice-Hall, Inc. 1986.

*Primary Examiner*—Alvin C. Chin-Shue
*Attorney, Agent, or Firm*—Oliff & Berridge

[57] ABSTRACT

A sawbuck includes a pivot beam which forms the pivot joint between the legs of at least three X-shaped sets of legs, and also forms a horizontal member of two or more Vierendeel trusses included in the sawbuck. In a preferred embodiment, the sawbuck includes a rigid pivot beam and three foldable X-shaped sets of legs, each set of legs including at least one pair of legs pivotally attached to each other between ends of the legs by the pivot beam. First and second ones of the three sets of legs are pivotally attached to the pivot beam adjacent to respective ends of the pivot beam, and a third one of the sets is pivotally attached to the pivot beam between the first and second sets. A first primary stabilizer beam is attached adjacent to a first end of a first one of the legs of each pair of legs so that the pivot beam, first legs and first primary stabilizer beam define a first Vierendeel truss. A second primary stabilizer beam is attached adjacent to the first end of a second one of the legs of each pair so that the pivot beam, second legs and second primary stabilizer beam define a second Vierendeel truss. A foldable tie bar, for releasably locking the X-shaped sets of legs and the sawbuck in an open position is attached between the first and second legs of at least one of the leg sets.

24 Claims, 5 Drawing Sheets

SAWBUCK INCLUDING VIERENDEEL TRUSS CONSTRUCTION

BACKGROUND OF THE INVENTION

1. Field of the Invention

The present invention relates to sawbucks, and in particular to light weight, collapsible, portable sawbucks.

2. Description of the Related Art

There are numerous designs for sawbucks in the prior art. Since these apparatus are frequently used by professional craftsmen such as carpenters, etc., many of these apparatus are designed to be portable. A major consideration in designing a portable sawbuck (as in any portable device) is to achieve structural stability with a minimum amount of weight. In order to be of the most use to a craftsman, a sawbuck must also be sturdy in use, and capable of withstanding forces applied from many different directions. Additionally, it is desirable that the sawbuck be capable of supporting a large amount of weight (for example, hundreds of pounds) without any substantial deflection or loss of stability.

U.S. Pat. No. 4,386,677 to Gulezian discloses a portable sawbuck having two pairs of X-shaped foldable legs attached to each other by a single metal, pipe-like axle or cross bar. The foldable legs can be formed from commercially available lumber such as 2×4s or 2×6s. A cross-brace, which can also be a hollow metal pipe, is attached between the inner legs of each pair of X-shaped foldable legs. Lugs are provided on plates which are attached to the inner legs of each leg pair to prevent the sawbuck from collapsing during use.

The transmission of force from the legs to the pipe-like axle is not direct because the wooden legs are attached to the pipe-like axle by the metal plates (which are attached to the legs by screws), each of which acts as a transition piece from the legs to the pipe-like axle. Accordingly, force is transmitted from the legs to the metal plate via the screws attaching the plate to the legs, concentrating most of the force in the portions of the legs receiving the screws. Additionally, the lugs provided on the plates to prevent the sawbuck from collapsing during use are located close to the center of rotation of the legs about the pipe-like axle, and consequently they must counteract a disproportionate amount of shear stress. Accordingly, the lugs must be welded to or cast unitarily with the plates. Furthermore, in order to limit the inward movement of the legs relative to the pipe-like axle, collars are welded to the axle. Accordingly, the sawbuck of Gulezian requires specialized fabrication (welding and metal mill work), increasing its cost and weight. An additional support structure on the pipe-like axle is also required in order to provide a flat work surface for supporting short pieces of work.

U.S. Pat. No. 3,034,546 to Parsons discloses a collapsible sawbuck having three pairs of metal legs with each leg pair having a pin joint for pivotally attaching the legs of a pair together. The leg pairs are attached to each other by disposing an angle-iron under each set of legs on each side of the sawbuck. The sawbuck is preventing from collapsing by chains or other suitable means attached between the angle-irons.

Due to the attachment of the angle-irons to the lowest surface of each leg, the sawbuck is seated along the entire length of each angle-iron on both sides. This construction makes for unstable bearing on uneven surfaces, which will cause the sawbuck to rock if used on uneven surf aces. Additionally, unless extremely strong welded connections can be provided between the legs and the angle-irons, the sawbuck of Parsons lacks rigidity, especially to forces applied in the direction parallel to the angle-irons. At any rate, a large amount of stress is concentrated in the welded joints between the legs and angle-iron due to the cantilever arrangement between each leg and its respective angle-iron. As with the device of Gulezian, specialized fabrication (i.e., welding) is required, thus increasing cost and weight. Additionally, the sawbuck of Parsons lacks versatility in that it is not suitable for providing a flat horizontal work surface or any type of support f or equipment which may be used by a craftsman.

U.S. Pat. No. 4,454,929 to Wellman discloses a collapsible portable sawbuck having three sets of support assemblies connected to one another by two horizontal members located near the lower ends of the support assemblies, and by a third horizontal member fastened to the top portion of each support assembly.

Although suitable for holding timber, the sawbuck of Wellman lacks versatility for the reasons described above with respect to Parsons. The lateral stability of the structure is compromised by the fact that each pivot point operates independently. The main lateral stability mechanism Wellman employs is a third horizontal member located near the top of the structure and is subject to being accidentally cut during use.

SUMMARY OF THE INVENTION

In order to overcome the shortcomings set forth above, and to provide a rigid, light weight, easy to construct sawbuck, the present invention provides a sawbuck wherein a pivot beam forms the pivot joint between the legs of at least three X-shaped sets of legs, and also forms a horizontal member of two or more Vierendeel trusses included in the sawbuck.

In a preferred embodiment, the sawbuck includes a rigid pivot beam and three foldable X-shaped sets of legs, each set of legs including at least one pair of legs pivotally attached to each other between ends of the legs by the pivot beam. First and second ones of the three sets of legs are pivotally attached to the pivot beam adjacent to respective ends of the pivot beam, and a third one of the sets is pivotally attached to the pivot beam between the first and second sets. A first primary stabilizer beam is attached adjacent to a first end of a first one of the legs of each pair of legs so that the pivot beam, first legs and first primary stabilizer beam define a first Vierendeel truss. A second primary stabilizer beam is attached adjacent to the first end of a second one of the legs of each pair so that the pivot beam, second legs and second primary stabilizer beam define a second Vierendeel truss. A locking means, such as, for example, a foldable tie bar, for releasably locking the X-shaped sets of legs and the sawbuck in an open position is attached between the first and second legs of at least one of the leg sets.

The first and second Vierendeel trusses, both of which include the pivot beam, provide for an exceptionally rigid sawbuck, which resists forces applied thereto from many directions, and in particular in a direction parallel to the pivot beam (the lateral direction of the sawbuck). The construction of the sawbuck permits light weight materials to be used as the pivot beam, legs and primary stabilizer beams. For example, commercially available polyvinyl chloride (PVC) plastic piping can be used as the pivot beam, and commercially available wood stock can be used to form the legs and primary stabilizer beams.

In another embodiment of the present invention, first and second secondary stabilizer beams are attached adjacent to second ends of the first and second legs, respectively so that the pivot beam, first legs and first secondary stabilizer beam define a third Vierendeel truss, and the pivot beam, second legs and second secondary stabilizer beam define a fourth Vierendeel truss. The third and fourth Vierendeel trusses further improve the rigidity of the sawbuck. Moreover, by attaching the secondary stabilizer beams to end portions of the second ends of the first and second legs, the secondary stabilizer beams define rails upon which an object, such as, for example, a miter saw, may be slidably supported.

As another embodiment of the present invention, notches can be provided in an inwardly facing side of the second end of each leg so that when the sawbuck is locked in the open position, the notches in the legs define horizontal and vertical support surfaces for limiting horizontal and vertical movement of an object placed in the notches. For example, wood stock such as, for example, a 2×6 can be laid flat on top of the sawbuck, and held in place by the notches to define a flat work surface.

Preferably, the third set of legs, located between the (first and second) end sets of legs have a length which is shorter than the length of the end sets of legs so that the first ends of the third set of legs do not contact the support surface upon which the sawbuck is placed. Only the first ends of the legs in the end sets of legs have support feet which contact the support surface. Accordingly, the sawbuck has only four feet (in spite of having six or more legs), enabling the sawbuck to be placed stably on uneven surfaces.

Preferably, each set of legs is formed by placing a hollow sleeve member through a bore formed in each leg of the set, and then clamping the legs of a set to one another by securing coupling members to each end of the sleeve member with the legs sandwiched between the coupling members. For example, commercially available glue suitable for use with PVC pipes can be used to secure the coupling members to the sleeve member. Beam members (which preferably are also sections of PVC pipe) are then attached between coupling members of different sets of legs, for example, using glue, to assemble the sets of legs into the sawbuck. The plastic beam members, sleeve members and coupling members define the integral pivot beam about which the legs pivot, and which forms a part of each Vierendeel truss.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1A:
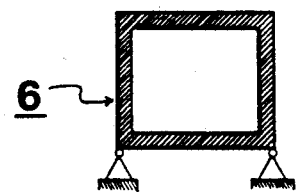
FIG. 1A is a front view of a frame.
Figure 1B:
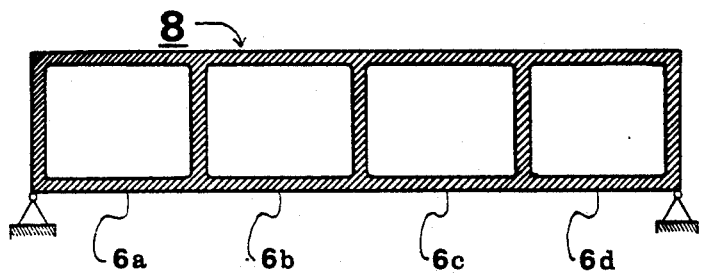
FIG. 1B is a front view of a Vierendeel truss defined by a plurality of adjacent frames.

The present invention utilizes two or more Vierendeel trusses to provide a rigid, preferably light weight sawbuck. With reference to FIG. 1A, basic structural design teaches that a frame 6 is comprised of two substantially vertical and two substantially horizontal beams forming a box in the shape of a rectangle or square, for example. (The term "substantial" is used because the beams need not be precisely vertical or horizontal, although such an arrangement yields the most efficient resolution of applied force, and therefore is preferred. However, arrangements where the vertical and horizontal beams join at other than 900 angles are possible.) As shown in FIG. 1B, a Vierendeel truss 8 is formed by two or more laterally adjacent frames. For example, the Vierendeel truss in FIG. 1B is comprised of four adjacent frames 6a, 6b, 6c and 6d. Furthermore, it is known that Vierendeel trusses can be stacked vertically on top of one another to form a Vierendeel truss structure. For further details on frames and trusses see, for example, "Structure in Architecture" by Mario Salvadori with Robert Heller, third edition, pages 190–193, Prentice-Hall (1986).

Figure 2:
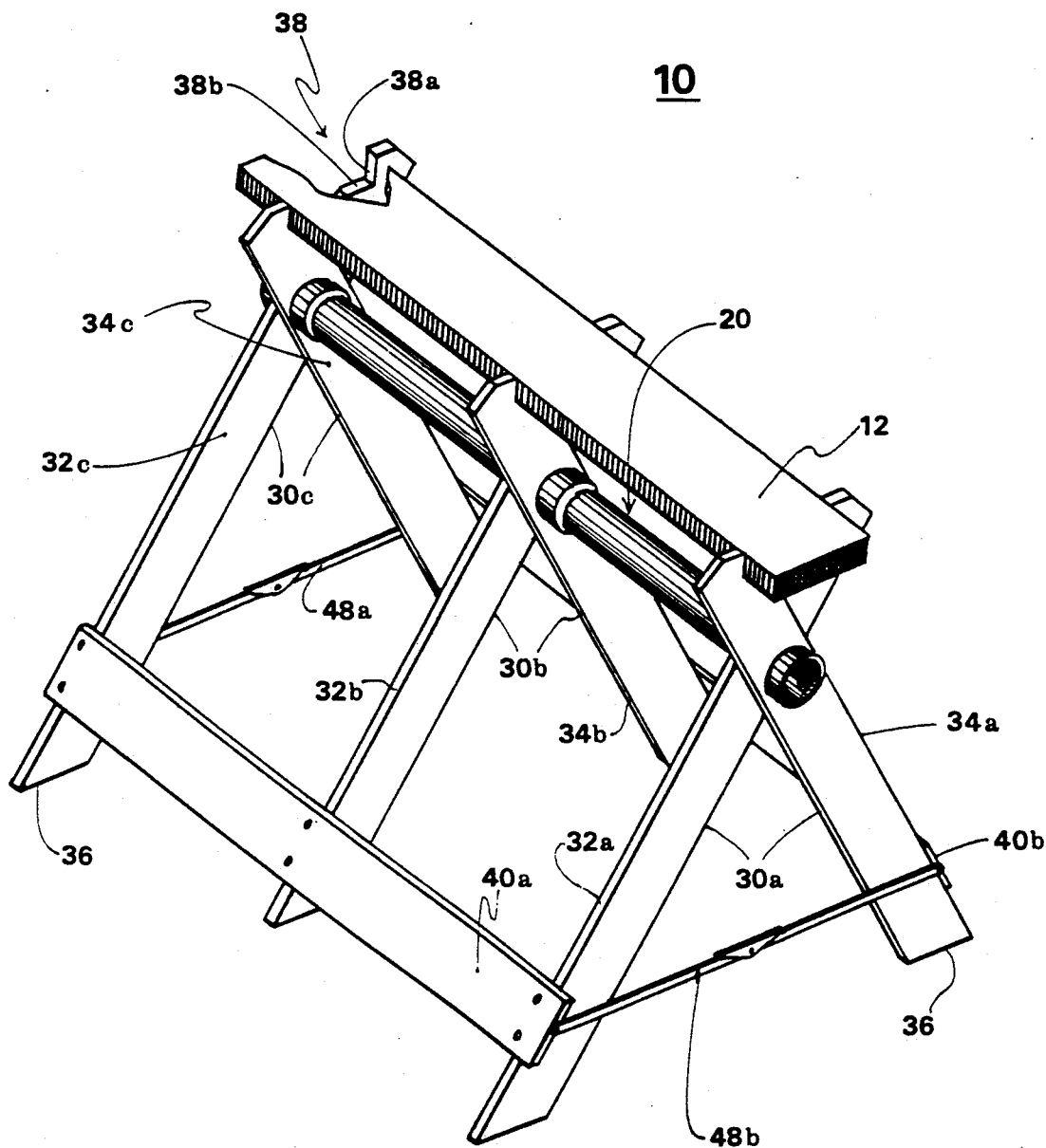
FIG. 2 is a perspective view of a sawbuck according to a first embodiment of the invention.

FIG. 2 illustrates a sawbuck 10 having two Vierendeel trusses in accordance with a first preferred embodiment of the present invention. Sawbuck 10 includes a rigid pivot beam 20 and at least three X-shaped sets of legs 30a, 30b, and 30c. Each X-shaped set of legs includes at least one pair of legs pivotally attached to each other between ends of the legs by pivot beam 20. A first set of legs 32a, 34a is pivotally attached to one end of pivot beam 20. A second set of legs 32c, 34c is attached to the opposite end of pivot beam 20. The third set of legs 32b, 34b is pivotally attached to pivot beam 20 between the first and second sets, for example, approximately at the midpoint of pivot beam 20. A first primary stabilizer beam 40a is attached adjacent to a first end of a first one of the legs 32a-c of each pair. A second primary stabilizer beam 40b is attached adjacent to the first end of a second one of the legs 34a-c of each pair. Accordingly, the pivot beam 20, first legs 32a-c and first primary stabilizer beam 40a define a first Vierendeel truss. The pivot beam 20 also forms part of a second Vierendeel truss along with second legs 34a-c and second primary stabilizer beam 40b. The double Vierendeel truss sawbuck is exceptionally rigid with respect to forces applied in a direction parallel to the longitudinal axis of pivot beam 20.

Collapsible tie bars 48a and 48b are attached between the first and second legs of leg pairs 30c and 30a, respectively. The tie bars prevent the sawbuck from collapsing during use, and function as a locking means for releasably locking the X-shaped sets of legs (and thus the sawbuck) in an open position. Of course, a single tie bar could also be provided on one of the end sets of legs 30a, 30c, or on the center set of legs 30b, although the arrangement illustrated in FIG. 2 is preferred. Additionally, other structures could be used in place of the collapsible tie bars 48a, 48b as long as the structure prevents the legs from overexpanding. For example, ropes or chains could be used between the legs in one or more of the sets of legs. Although ropes or chains prevent overexpansion of the leg sets, structure which also prevents the legs from moving towards one another when in the open position is preferred. The collapsible tie bars 48a, 48b are suitable for preventing the sets of legs from moving towards one another, although a removable, noncollapsible tie bar defined by a single metal bar which is removably attachable to each leg (e.g., legs 32a and 34a) could also be used, and functions best at preventing the legs from moving away from or towards each other when in the open position.

As another alternative, a lug arrangement, such as used in the above-referenced patent to Gulezian could also be used as a locking means, although such a lug arrangement is not preferred due to the large stresses development in the lugs.

During use, a workpiece (e.g., lumber, logs, pipes, etc.) can be supported on the end portions of the second ends of the legs (the upper ends of the legs in FIG. 2), or between the second ends of each pair of legs (e.g., when the workpiece is beam-type wood stock, logs or a pipe) for performing cutting operations, etc. on the workpiece.

Although not required, an option available with the sawbuck of the present invention, and as illustrated in FIG. 2, is the provision of notches 38 in the inwardly facing sides of the second ends of each leg. The notches 38 define horizontal surfaces 38b and vertical surfaces 38a suitable for holding a flat piece of wood stock (such as, for example, a 2×6) 12. The wood stock 12 can then be used as a flat work surface.

Another preferred feature of the present invention involves making the central legs 32b, 34b (i.e., in the third set of legs 30b) with a length less than the length of the first and second end sets of legs 30a, 30c so that only the first ends of the legs in the end sets of legs define support feet 36 which contact a support surface (e.g., the ground) when the sawbuck is placed on the support surface. The provision of four support feet 36 instead of six support feet enables the sawbuck to be placed stably on uneven surfaces, while still benefiting from the advantage of the middle set of legs 30b in defining the Vierendeel truss.

Figure 3:
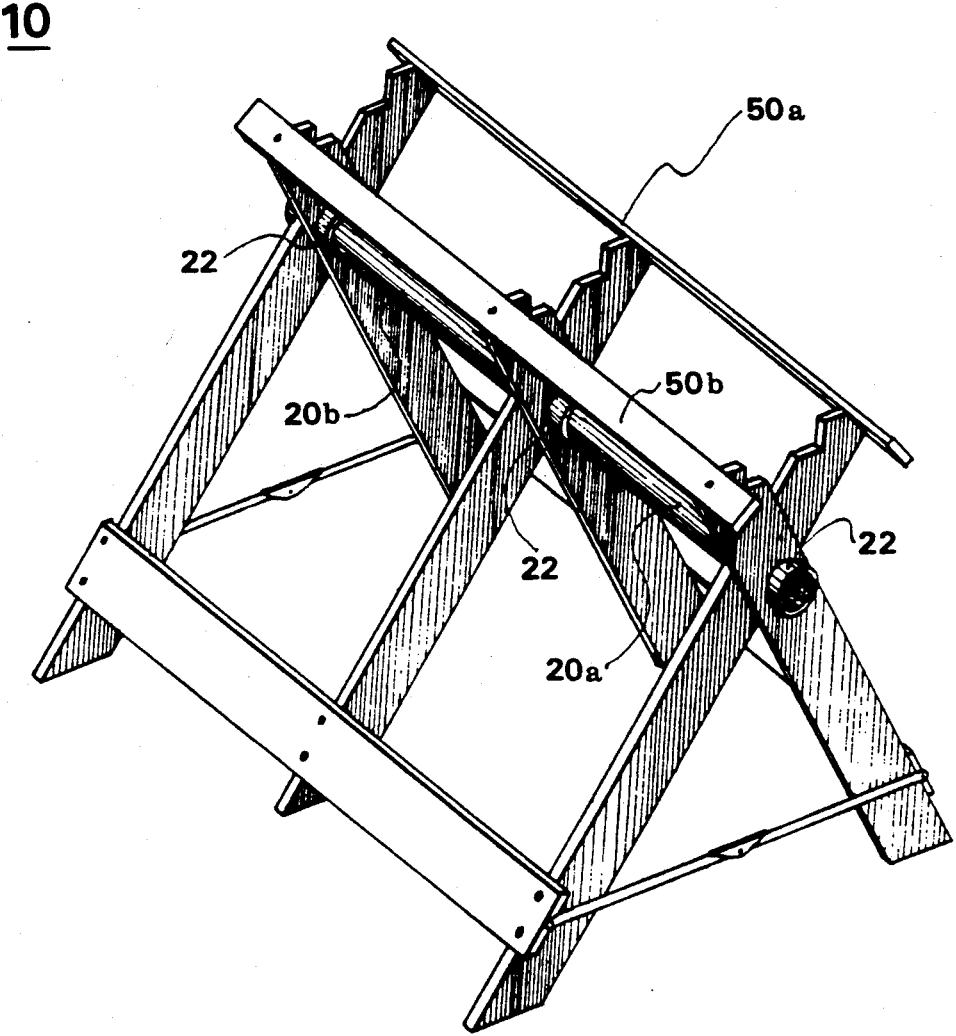
FIG. 3 is a perspective view of a sawbuck according to a second embodiment of the invention.

FIG. 3 illustrates another embodiment of the present invention wherein first and second secondary stabilizer beams 50a, 50b are attached adjacent to second ends of the legs. The secondary stabilizer beams 50a, 50b further increase the rigidity of the sawbuck by defining, along with pivot beam 20 and the first and second sets of legs, third and fourth Vierendeel trusses. When secondary stabilizer beams 50a, 50b are provided on end portions of the second ends of legs, they define rails upon which an object may be slidably supported. For example, a miter saw can be placed on rails 50a, 50b and moved in the direction parallel to the longitudinal axis of pivot beam 20 (and parallel to secondary stabilizer beams 50a, 50b) as required by the craftsman.

Figure 4A:
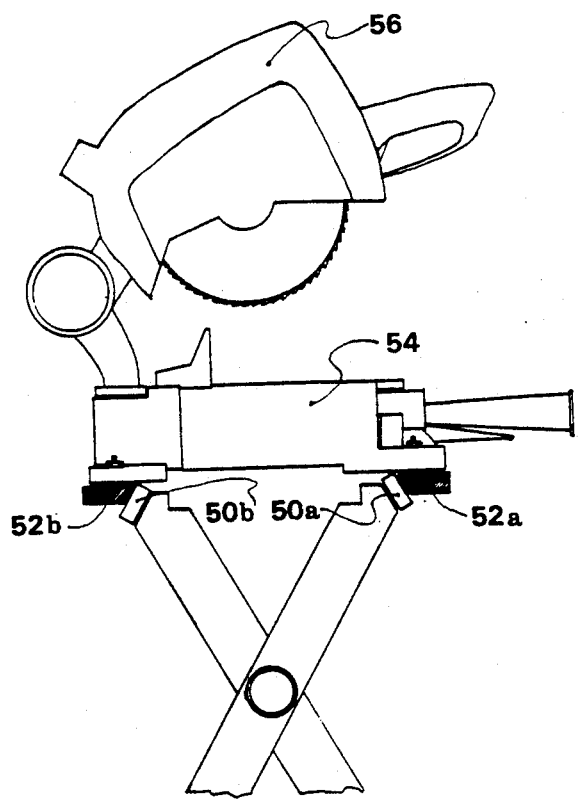
FIG. 4A is an end view of a first miter saw slideably mounted on the rails of the FIG. 3 sawbuck.
Figure 4B:
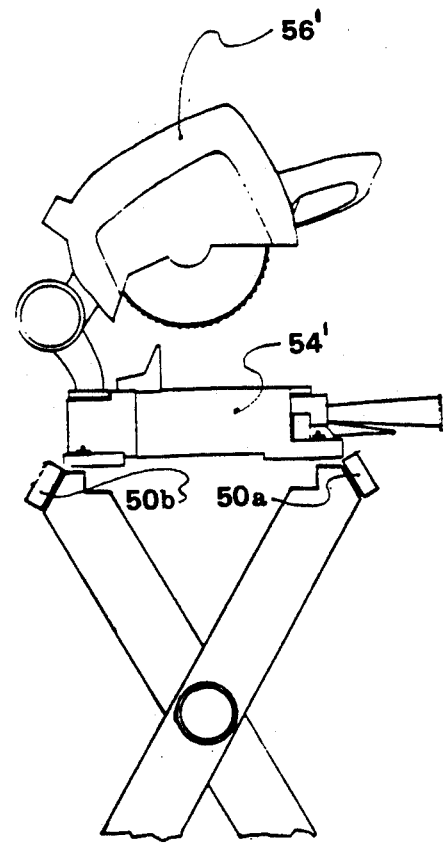
FIG. 4B is an end view of a second miter saw, smaller than the FIG. 4A miter saw, slideably mounted on the rails of the FIG. 3 sawbuck.

FIGS. 4A and 4B illustrate two different ways in which a miter saw 56, schematically illustrated in FIGS. 4A and 4B, can be slideably mounted on rails 50a, 50b of the FIG. 3 sawbuck. Miter saws typically include a support structure 54 upon which the saw 56 is mounted. If the support structure 54 is large enough to span the distance between rails 50a, 50b as shown in FIG. 4A, blocks 52a, 52b (made, for example, from wood) can be attached to the lower surface of support 54 to act as guides for guiding the slideable movement of miter saw 56 along the longitudinal length of rails 50a, 50b. Since FIG. 4A is an end view of the sawbuck having miter saw 56 mounted therein, only two blocks 52a, 52b are shown. However, preferably four blocks are provided, one block on each corner of support 54. As an alternative, when a smaller miter saw 56' mounted on a smaller support 54' is used as shown in FIG. 4B, end portions of support 54' can directly engage and slide along surfaces of rails 50a, 50b. Accordingly, the FIG. 3 embodiment permits a miter saw (or other tool) to be conveniently moved to a variety of positions on sawbuck 10. Since the sawbuck includes four Vierendeel trusses, the sawbuck is exceptionally rigid and does not sway or wobble as the miter saw is moved along rails 50a, 50b.

Figure 5:
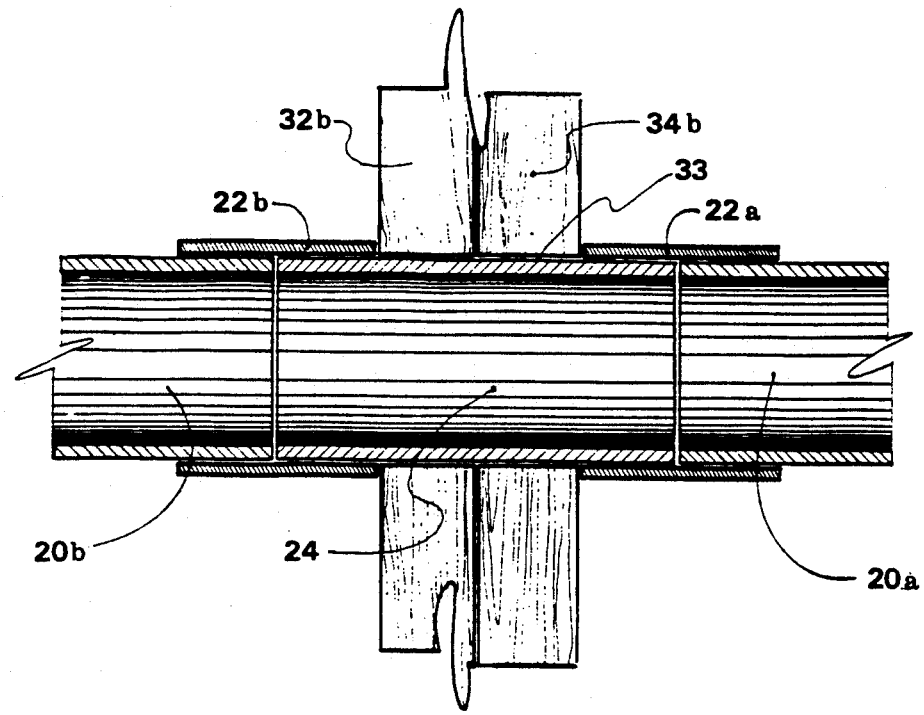
FIG. 5 is a schematic view of the sleeve/coupling member construction used to form each set of legs in a preferred embodiment of the invention.

FIG. 5 illustrates a preferred manner in which each leg pair 30a, 30b, 30c can be pivotally attached to pivot beam 20. FIG. 5 shows the attachment of first leg 32b and second leg 34b of the third set of legs 30b which is attached near the central portion of pivot beam 20. Legs 32b, 34b are shown in phantom in FIG. 5. Each leg includes a bore 33 therethrough, preferably located closer to the second (or upper) end of the leg than to the first (or lower) end of the leg. A sleeve member 24 is inserted through the bores 33 in legs 32b, 34b so that the legs are pivotally attached to each other and to sleeve member 24. The outer diameter of sleeve member 24 is substantially the same as the diameter of the bore 33 in each leg so that there is a tight fit therebetween. Coupling members 22a, 22b are then attached to respective ends of sleeve member 24 so that legs 32b, 34b are clamped between coupling members 22a, 22b. When a plastic material such as, for example, PVC pipe is used to form sleeve member 24 and coupling members 22a, 22b, a suitable adhesive preferably is used to secure coupling members 22a, 22b to sleeve 24. Although other means can be used to attach coupling members 22a, 22b to sleeve member 24, such as, for example, threads, the use of adhesive is inexpensive and provides for a rigid, strong and permanent attachment.

A plurality of X-shaped sets of legs can be formed as described above. In order to complete fabrication of the sawbuck, pivot beam members 20a, 20b (which also can be PVC pipe) are attached between at least three sets of legs, as illustrated in FIG. 3 and attached thereto using a suitable adhesive. The pivot beam members 20a, 20b, the sleeve members 24 and the coupling member 22a, 22b of all sets of legs define the pivot beam 20 about which the sets of legs are pivotally attached. The first and second primary stabilizer beams 40a, 40b are then attached to the respective legs of each set to complete fabrication of the sawbuck.

The outermost coupling members 22 of pivot beam 20 can be provided with caps 26 (which can be threadably attached to the couplings 22). Material such as, for example, blueprints or the tie bars (particularly when a non-collapsible one piece tie bar is used) can be stored in pivot beam 20 because preferably hollow PVC piping is used.

Figure 6:
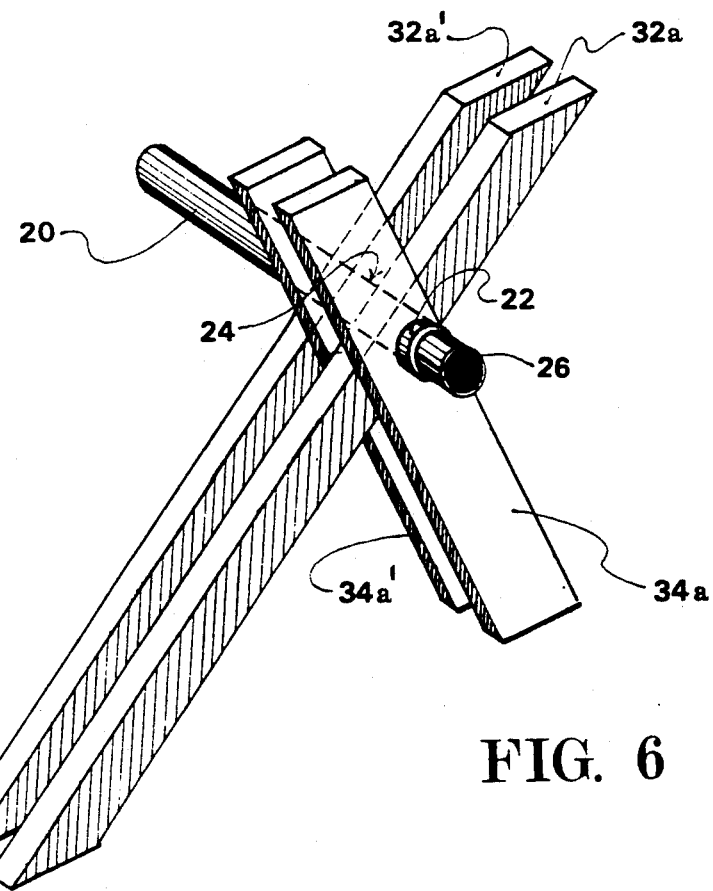
FIG. 6 is a perspective partial view of another embodiment of the invention suitable for withstanding higher loads.

In order to provide an even sturdier sawbuck, two or more pairs of legs can be provided in each X-shaped set. FIG. 6 illustrates the use of two pairs of legs in each set. The FIG. 6 embodiment can be fabricated in the same manner as described above with respect to FIG. 5, except that a longer sleeve member 24 is utilized to hold a first pair 32a, 34a and a second pair 32a', 34a' of legs.

Figure 7:
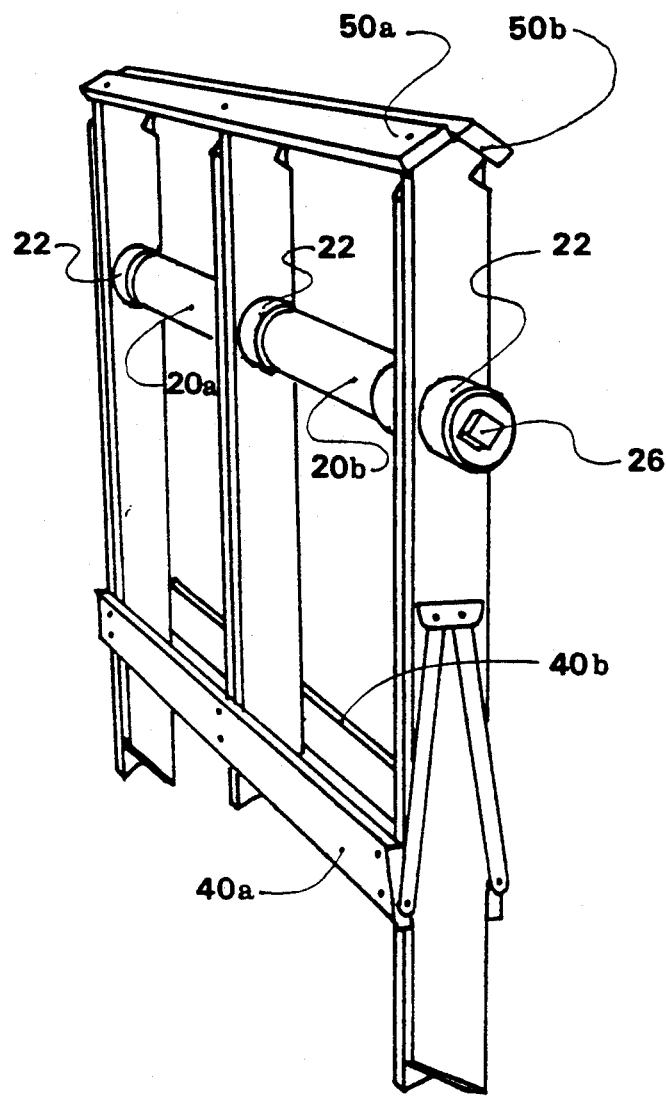
FIG. 7 is a perspective view of the second embodiment of the invention in the collapsed state.

FIG. 7 illustrates the manner in which the sawbuck can be collapsed for storage. Even when rails 50a, 50b are provided on the sawbuck, the sawbuck can be collapsed so that it is no wider than the width of a single leg combined with the total thicknesses of each primary stabilizer beam 40a, 40b.

A sawbuck having the construction illustrated in FIGS. 3 and 7 was constructed using ¾×2½" wood stock (standard dressed 1×3") to form the legs and primary stabilizer beams. One and one-half inch PVC piping and suitable couplings were used to form pivot beam 20. Redwood was used for its known resistance to the elements. The sawbuck was capable of supporting a person weighing 150 pounds with virtually no deflection and minimal side sway. The sawbuck had a height of about 30" and a base width of about two feet when open, was capable of being folded to a thickness of 4", and had a weight of 9 pounds allowing for easy transport and compact storage. Similarly sized douglas fir wood stock (which is more rigid than redwood) was used to form a heavy duty sawbuck having three sets of legs, wherein each set included two pairs of legs. The sawbuck was exceptionally rigid and weighed 15 pounds. This compares favorably with available portable collapsible sawbucks or work benches, which usually weigh between 30 and 60 pounds.

Although the illustrated sawbuck has three sets of legs, it is possible to use four or more sets of legs in a sawbuck constructed in accordance with the present invention. The ease with which each set of legs (as illustrated in FIG. 5) can be fabricated lends itself to fabricating plural sets of legs (as modules). As many leg sets as is desired then can be joined (using pivot beam members) to form a sawbuck.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

I claim:

1. A sawbuck comprising:
   a rigid pivot beam;
   three foldable X-shaped sets of legs, each set of legs including at least one pair of legs pivotally attached to each other between ends of said legs by said pivot beam, first and second sets of said legs being pivotally attached to said pivot beam adjacent to respective ends of said pivot beam, and a third one of said sets being pivotally attached to said pivot beam between said first and second sets;
   a first primary stabilizer beam attached adjacent to a first end of a first one of the legs of each pair and a second primary stabilizer beam attached adjacent to the first end of a second one of the legs of each pair, so that said pivot beam, first legs and first primary stabilizer beam define a first Vierendeel truss and said pivot beam, second legs and second primary stabilizer beam define a second Vierendeel truss, said pivot beam extending entirely through said legs and including couplings for attaching the pivot beam to said sets of legs so that said legs do not move laterally relative to said pivot beam and so that forces applied to the sawbuck are transferred between the pivot beam and the sets of legs so as to rigidify the Vierendeel trusses; and
   locking means for releasably locking said X-shaped sets of legs and thus said sawbuck in an open position.

2. The sawbuck of claim 1, further comprising:
   first and second secondary stabilizer beams attached adjacent to second ends of said first and second legs, respectively, sot hat said pivot beam, first legs and first secondary stabilizer beam define a third Vierendeel truss and said pivot beam, second legs and second secondary stabilizer beam define a fourth Vierendeel truss.

3. The sawbuck of claim 2, wherein said first stabilizer beam and said second stabilize beam are attached to end portions of said second ends of said first and second legs, respectively, to define rails upon which an object may be slideably supported.

4. The sawbuck of claim 1, wherein said locking means includes at least one foldable tie bar attached between the first and second legs of at least one of said pairs of legs adjacent to said first ends of said legs.

5. The sawbuck of claim 4, wherein said locking means includes two of said tie bars, a first one of said tie bars attached to said first set of legs and a second one of said tie bars attached to said second set of legs.

6. The sawbuck of claim 1, wherein said first and second sets of legs have equal lengths, longer than a length of said third set of legs, so that the first ends of the legs in said first and second sets define support feet which contact a support surface when said sawbuck is placed thereon, and the first ends of the legs in said third set are spaced from said support surface.

7. The sawbuck of claim 1, wherein the second ends of said legs each include a notch in an inwardly facing side thereof so that when said sawbuck is locked in said open position the notches in said legs define horizontal and vertical support surfaces for limiting horizontal and vertical movement of an object placed in said notches.

8. The sawbuck of claim 1, wherein each of said sets of legs includes two pairs of legs.

9. The sawbuck of claim 1, wherein said pivot beam is an integral member of plastic pipe.

10. The sawbuck of claim 9, wherein said plastic is polyvinyl chloride.

11. The sawbuck of claim 1, wherein said legs are wooden members.

12. A sawbuck comprising;
   three foldable X-shaped sets of legs, each set of legs including:
   at least one pair of legs, each leg having a bore extending therethrough between ends of said legs;
   a sleeve member inserted through said bores in said legs so as to pivotally attache said at least one pair of legs to each other, first and second opposite ends of said sleeve member extending beyond said at least one pair of legs; and
   a pair of cylindrical coupling members having radially inner surfaces respectively attached to radially outer surfaces of said first and said second opposite ends of said sleeve member with said at lest one pair of legs being clamped between and in contact with said pair of coupling members;
   a first beam member having a firs en detached to the radially inner surface of a first one of the coupling members of said first set of legs and a second end attached to the radially inner surface of a first one of the coupling members of the third set of legs, and a second beam member having a first end attached to the radially inner surface of a second one of the coupling members of said third set of legs and s second end attached to the radially inner surface of a first one of the coupling members of the second set of legs, whereby said first and second beam members, the sleeve members and said coupling members define a rigid pivot beam about which said three sets of legs pivot;

a first primary stabilizer beam attached adjacent to a first end of a first one of the legs of each pair and a second primary stabilizer beam attached adjacent to the first end of a second one of the legs of each pair, so that said pivot beam, fist legs and first primary stabilizer beam define a first Vierendeel truss and said pivot beam, second legs and second primary stabilizer beam define a second Vierendeel truss; and locking means for releasably locking said X-shaped sets of legs and thus said sawbuck in an open position.

13. The sawbuck of claim 12, further comprising:

first and second secondary stabilizer beams attached adjacent to second ends of said first and second legs, respectively, so that said pivot beam, first legs and first secondary stabilizer beam define a third Vierendeel truss and said pivot beam, second legs and second secondary stabilizer beam define a fourth Vierendeel truss.

14. The sawbuck of claim 13, wherein said first stabilizer beam and said second stabilizer beam are attached to end portions of said second ends of said first and second legs, respectively, to define rails upon which an object may be slideably supported.

15. The sawbuck of claim 12, wherein said locking means includes at least on foldable tie bar attached between the first and second legs of at least one of said pairs of legs adjacent to said first ends of said legs.

16. The sawbuck of claim 15, wherein said locking means includes two of said tie bars, a first one of said tie bars attached to said first set of legs and a second one of said tie bars attached to said second set of legs.

17. The sawbuck of claim 12, wherein said first and second sets of legs have equal lengths, longer than a length of said third set of legs, so that the first ends of the legs in said first and second sets define support feet which contact a support surface when said sawbuck is placed thereon, and the first ends of the legs in said third set are spaced from said support surface.

18. The sawbuck of claim 12, wherein the second ends of said legs each include a notch in an inwardly facing side thereof so that when said sawbuck is locked in said open position the notches in said legs define horizontal and vertical support surfaces for limiting horizontal and vertical movement of an object placed in said notches.

19. The sawbuck of claim 12, wherein each of said sets of legs includes two pair of legs.

20. The sawbuck of claim 12, wherein said pivot beam members, said sleeve members and said coupling members are hollow plastic members.

21. The sawbuck of claim 20, wherein said plastic is polyvinyl chloride.

22. The sawbuck of claim 12, wherein said legs are wooden members.

23. A sawbuck comprising:

a rigid plastic pivot beam;

three foldable X-shaped sets of wooden legs, each set of legs including at least one pair of wooden legs pivotally attached to each other by said pivot beam between first and second ends of said legs at a pivot point which is further from said first ends of said legs than from said second ends, first and second sets of said legs being pivotally attached to said pivot beam adjacent to respective ends of said pivot beam, and a third done of said sets being pivotally attached to said pivot beam between said first and second sets;

a first primary stabilizer beam attached adjacent to the first end of a first one of the legs of each pair and a second primary stabilizer beam attached adjacent to the first end of a second one of the legs of each pair, sot hat said pivot beam, first legs and first primary stabilizer beam define a first Vierendeel truss and said pivot beam, second legs and second primary stabilizer beam define a second Vierendeel truss, said pivot beam including couplings for attaching the pivot beam to said sets f legs so that said legs do not move laterally relative to said pivot beam and so that forces applied to the sawbuck are transferred between the pivot beam and the sets of legs so as to rigidify the Vierendeel trusses; and locking means for releasably locking said X-shaped sets of legs and thus said sawbuck in an open position.

24. A sawbuck comprising:

a rigid pivot beam;

three foldable X-shaped sets of legs, each set of legs including at least one pair of legs pivotally attached to each other between ends of said legs by said pivot beam, fist and second sets of said legs being pivotally attached to said pivot beam adjacent to respective ends of said pivot beam, and a third one of said sets being pivotally attached to said pivot beam between said first and second sets;

a first primary stabilizer beam attached adjacent to a first end of a first one of the legs of each pair and a second primary stabilizer beam attached adjacent to the first end of a second one of the legs of each pair, so that said pivot beam, first legs and first primary stabilizer beam define a first Vierendeel truss and said pivot beam, second legs and second primary stabilizer beam define a second Vierendeel truss; and locking means for releasably locking said X-shaped sets of legs and thus said sawbuck in an open position;

wherein said first and second sets of legs have equal lengths, longer than a length of said third set of legs, so that the first ends of the legs in said first and second sets define support feet which contact a support surface when said sawbuck is placed thereon, and the first ends of the legs in said third set are spaced from said support surface.

* * * * *